United States Patent [19]

Herrmann

[11] Patent Number: 5,889,064

[45] Date of Patent: Mar. 30, 1999

[54] PROCESS AND APPARATUS FOR PRODUCING A FOAMED POLYMER

[76] Inventor: Torsten Herrmann, Behringstrasse 6, D-82152 Planegg, Germany

[21] Appl. No.: 849,040

[22] PCT Filed: May 9, 1996

[86] PCT No.: PCT/EP96/01971

§ 371 Date: Aug. 6, 1997

§ 102(e) Date: Aug. 6, 1997

[87] PCT Pub. No.: WO96/41709

PCT Pub. Date: Dec. 27, 1996

[30] Foreign Application Priority Data

Jun. 13, 1995 [DE] Germany ............... 195 21 520.6

[51] Int. Cl.⁶ .................................................... C08J 9/00
[52] U.S. Cl. ........................... 521/82; 521/142; 521/143; 521/146; 521/917
[58] Field of Search .................. 521/155, 82, 142, 521/143, 146, 917

[56] References Cited

U.S. PATENT DOCUMENTS 5,158,986  10/1992  Cha et al. ................................ 521/82

FOREIGN PATENT DOCUMENTS

| 3316 838 A1 | 11/1984 | Germany . |
| 3600 041 A1 | 7/1987 | Germany . |
| 3833 777 C2 | 10/1990 | Germany . |
| 59-164124 | 9/1959 | Japan . |
| 6-91725 | 4/1994 | Japan . |
| 671 186 A5 | 8/1989 | Switzerland . |

*Primary Examiner*—Morton Foelak
*Attorney, Agent, or Firm*—Burns, Doane, Swecker & Mathis, L.L.P.

[57] ABSTRACT

In the process and an extrusion device for producing a foamed polymer, a polymer is melted and a foaming agent is added to the polymer melt. After the polymer melt and the foaming agent have been mixed, a throttle generates a pressure drop for nucleation for gas bubbles or cells. The mixture is then shaped, foamed and cooled. In order to produce high-grade foamed polymer with a microcellular or sub-microcellular structure continuously without any shaping limitations, the throttle controlling the flow rate has a passage control so that the flow rate can be adjusted independently of the pressure drop.

12 Claims, 2 Drawing Sheets

PROCESS AND APPARATUS FOR PRODUCING A FOAMED POLYMER

The present invention relates to a process and an extrusion apparatus for producing a foamed polymer.

U.S. Pat. No. 5,158,986 discloses a process and an extrusion apparatus comprising the features of the preamble of claim 1 and claim 13, respectively. Foamed polymers which have a microcellular or submicrocellular structure are to be produced thereby. Such a structure is obtained by forming small bubbles or cells in the polymer by way of foaming, with the bubbles or cells having a size of at least 10 $\mu$m and a cell density of more than $10^9$ cells/cm$^3$ in the microcellular structure, and a cell size of less than 1 $\mu$m and a cell density of more than $10^{12}$ cells/cm$^3$ in the submicrocellular structure.

In the known process for producing foamed polymer by means of an extrusion apparatus, the polymer is fed to the extrusion apparatus and subsequently molten. A pressurized foaming agent, such as $Co_2$, $N_2$ or the like, is fed to the polymer melt. As much foaming agent as is soluble in the polymer melt at a given pressure and temperature is to be supplied to the melt. Polymer melt and foaming agent are subsequently mixed to produce a single-phase mixture or solution.

To make the polymer foam, a pressure drop or rise in temperature is subsequently produced, as a result of which the foaming agent, which has been added to the polymer, starts to expand and the polymer is foamed. In the known process and in the known apparatus, a pressure drop is produced by a throttle, which results in a thermodynamic instability in the mixture of polymer and foaming agent. The solubility of the foaming agent in the polymer is suddenly changed thereby and a nucleation for small gas bubbles or gas cells starts in the polymer. These bubbles or cell will grow until the pressure is reduced to ambient pressure and the temperature falls below a so-called glass transition or melt temperature of the polymer. In a preceding step, or at the same time, the foamed polymer is molded in a molding tool to obtain a final product.

In the method and apparatus of the prior art, a pressure drop is produced in a nozzle-like throttle. The throttle comprises an inlet port with a cross-section that is greater than the cross-section of the outlet port of the throttle. As a result of this reduced cross-section, the throttle has the additional function to build up pressure in the extrusion apparatus, with the pressure drop as required for foaming being produced by friction inside the throttle between inlet port and outlet port. Furthermore, a flow rate for the mixture of polymer and foaming agent flowing through the nozzle is predetermined by the inner structure of the throttle and the pressure drop produced. It has been found that, when such a nozzle-like throttle is used, it is only a filament-like or sheet-like discharge of the foamed polymer that can take place if the final product is to be of a sufficiently good quality. A good quality of the final product will be achieved if the cell size is, for instance, small, the cell density very high, and the cells are homogeneously distributed in the foamed polymer. Another quality improvement is obtained at a small degree of orientation of the polymer molecules.

JP 6-91725 A also discloses a process and an apparatus wherein a gear pump increases the pressure in the mixture of polymer and foaming agent. The pressure is adjusted by an additional pressure control valve and it is only after that valve that a foamed sheet is produced through a molding tool.

DE 38 33 777 C2 describes an extruder/gear pump combination for high-speed extrusion. A pressure build-up along the screw axis of the single-screw extruder is to be as low as possible and only a gear pump is to permit a substantial pressure build-up in the melt. The throughput is to be easily adjustable by adjusting the speed of the gear pump and the extruder speed which is adapted thereto in a controlled manner. Furthermore, a measuring probe is provided by which the screw speed is controlled such that a predetermined setpoint value is observed for the pressure at the screw tip and suction opening of the gear pump. A corresponding nozzle tool can be flanged to the exit opening of the gear pump.

In the journal "Plastverarbeiter", 1984, no. 12, pages 110–112, a gear pump is also arranged at the end of an extruder. In this case, too, a preselected pressure is maintained by controlling the extruder speed. After the gear pump, the pressure is considerably higher than before the pump directly following the extruder. The so-called extruder pulsation is to be eliminated thereby, and the uniformity of the product delivered is to be improved.

In the last-mentioned documents, too, pressure is only built up by a gear pump which is arranged downstream of the extruder. The flow rate is to be kept constant by such a pump and the pressure within the conveyed medium is to be increased.

It is the object of the present invention to improve the above-mentioned process and the above-mentioned apparatus such that it is possible to continuously produce foamed polymer with a microcellular or submicrocellular structure of high quality and without any restrictions as to the molding process.

The object underlying the invention is achieved through the process according to claim 1. A flow rate of the throttle is adjusted upon generation of the pressure drop for controlling the mixing amount of polymer and foaming agent discharged by the throttle, and the input pressure of the throttle is varied in response to the output pressure for maintaining the pressure drop independently of the set flow rate. Furthermore, the object is achieved with an apparatus by the features of patent claim 13.

On account of the flow control, the pressure drop as produced and the throughput or flow rate of the mixture of polymer and foaming agent are decoupled from one another, so that, even in case of a change in flow rate, the pressure drop, i.e. especially the pressure drop rate, as well as the nucleation rate can be kept constant. Even in the case of a high throughput, a final product of high quality is produced. Moreover, thanks to the higher throughput, the throttle is able to discharge not only filament- or sheet-like material, but the outlet port of the throttle may have a relatively large cross-section for discharging a relatively large amount of material. The nucleation process is homogeneous over the whole cross-section of the discharge port of the throttle because of the pressure drop rate and nucleation rate maintained.

Furthermore, the throttle can be used for discharging different amounts of material by controlling the throughput or flow within the throttle. An exchange as is required in a nozzle-like throttle for varying the flow is not necessary. As a result, a continuous production of foamed polymer is also possible when different demands are made on the quantities.

To maintain the pressure drop upon change of the flow or flow rate independently of the flow rate set, the input pressure of the throttle may be varied in response to the output pressure. The output pressure is normally produced by a resistance formed by a downstream molding tool. The input pressure results mainly from the pressure which has been built up in front of the throttle in the extrustion apparatus. The built-up pressure can, for instance, be varied in an extrusion apparatus, including an extruder having at least one extruder screw, by varying the rotational speed of the extruder screw.

A gear pump is preferably used as a throttle. The gear pump serves as a throttle when the input pressure thereof is greater than the output pressure. The gear pump comprises at least two meshing gears, the rotational speed of at least one gear being controllable by the flow control. In a gear pump as the throttle, there is the further advantage that the pressure drops substantially instantaneously, i.e., the pressure drop rate is very high. This has the effect that in contrast to a nozzle-like throttle the pressure does not drop continuously over the whole throttle length. In the nozzle-like throttle, this has the disadvantage that nucleation takes place during the entire period of time in which the pressure drops inside the throttle. As a consequence, nuclei which have been formed first will grow during the entire period of time, so that the nuclei and thus the subsequent gas bubbles or gas cells will have different sizes, whereby the cell size becomes inhomogeneous. Furthermore, the larger nuclei will absorb foaming agent which will then be lost for further nucelation and thus for the generation of a higher cell density.

The above-mentioned disadvantages can only be eliminated in a nozzle-like throttle by using a nozzle of reduced cross-section and reduced length. This, however, has the further disadvantage that only a small amount of polymer can be discharged through the reduced cross-section and that at a reduced cross-section the nuclei are subjected to a relatively high shear load. As a result, the nuclei are deformed in a specific direction upon discharge from the nozzle, so that the foamed final product will have anisotropic properties. Such properties will also be obtained in this type of nozzle by the polymer molecules having a high degree of orientation.

These disadvantages are not found in a gear pump acting as a throttle. Furthermore, the relatively large cross-section of the discharge port of the gear pump ensures that the throttle does not get clogged, as can be observed in nozzle-like throttles.

Hence, thanks to the dwell time of the mixture of polymer and foaming agent in the throttle which is fairly short, the gear pump permits a higher pressure-drop rate and a higher nucleation rate without any increase in shear, whereby a foamed polymer can be produced with a higher and more regular cell density at a low degree of orientation of the polymer molecules. It should especially be noted that the pressure drop inside the gear pump does not take place because of any friction caused by the plastic flow of the mixture of polymer and foaming agent, as is the case inside a nozzle-like throttle. Thus, high viscosities for the mixture of polymer and foaming agent are also made possible. Therefore, the gear pump as a throttle can operate as a nozzle-like throttle at a decreased temperature. Nucleation and cell growth are stabilized by the low temperature, and a coalescence of cells is largely prevented.

An advantageous embodiment of the invention comprises a control and evaluation unit which can measure input and output pressures of the throttle and control the rotational speed of a gear of the gear pump as the throttle. This makes it possible to easily maintain the pressure drop by varying the rotational speed of the extruder screw and to vary the flow rate by changing the rotational speed of the gears of the gear pump.

In the extruder of the extrusion device, an extruder screw comprising at least one feed section, plasticating section and mixing section is used as the extruder screw. In the feed section the polymer is fed in the form of comminuted polymer particles, especially pellets. In the subsequent plasticating section, the polymer is molten by additional heat supply and fed as a polymer melt to the mixing section. In the mixing section, the foaming agent fed by a feeder to the extruder is mixed with the polymer melt.

It is here of advantage when in the feed section recesses or grooves which substantially extend in transportation direction or the axial direction of the extruder screw are formed in an extruder barrel surrounding the extruder screw. This results in an increased friction between extruder barrel and polymer particles because polymer particles transported along the recesses and polymer particles transported directly by the extruder screw rub against one another and get jammed. As a result, the pressure inside the extrusion apparatus or inside the extruder will be raised to a maximum level and the transportation efficency will be higher than in the case of a smooth extruder barrel or extruder cylinder.

The grooves have preferably a conical shape and a depth which decreases in the direction of transportation, with the grooves ending in the feed section. The grooves may be equidistantly arranged in the circumferential direction of the extruder barrel.

The use of such an extruder, which is grooved in the feed section, has a number of advantages, especially when combined with the gear pump as the throttle.

Since the maximum pressure inside the extruder is already substantially reached at the end of the feed section of the extruder screw, a backflow of foaming agent along the extruder screw towards the feed section does not take place. Such a backflow would have the disadvantage that heat is transported towards the feed section, whereby the polymer particles or the pellets can already melt in a hopper for supplying the polymer to the extruder. Furthermore, in case of a backflow there will be the risk that polymer particles are ejected from the hopper in an explosive manner whereby, apart from an impairment of the function of the extrusion apparatus, the persons operating the apparatus get exposed to a high risk of injury. It should be noted that the pressure prevailing in a microcellular or submicrocellular extrusion process is substantially higher than in conventional foam extrusion, since in addition to the normal extrusion pressure a so-called nucleation pressure must be built up. The latter is required for nucleation.

The maximum pressure built up in the feed section is substantially higher than the maximum pressure which can be built up in an extruder without any recesses or grooves in the feed section. Even after a certain pressure drop along the plasticating section and then along the mixing section of the pressure in the extruder, the pressure in the extruder is so high that a major amount of foaming agent is soluble in the polymer as compared with extruders having smooth extruder cylinders. As a consequence, this increased solubility will entail a higher nucleation density or cell density in combination with smaller cell sizes. Furthermore, in combination with the gear pump acting as a throttle, a higher operating pressure is possible without the flow rate in the throttle being reduced. With the former nozzle-like throttles, an increase in the operating pressure is only possible inside the throttle by reducing the cross-section of the opening. This entails economical disadvantages and also a disadvantageous process technique.

To prevent the temperature from possibly rising in the feed section due to the arising friction already to such an extent that the polymer particles start to melt, the extrusion device comprises a tempering device, preferably a cooler, in this section. This ensures on the one hand that the maximum pressure can really be built up by internal friction and on the other hand that it is not before the plasticating section that the polymer melt is produced.

To prevent still unmolten polymer particles from passing up to and into the mixing section, shear elements are arranged in the plasticating section of the extruder screw for retaining these unmolten particles.

Following the plasticating section the foaming agent is fed in metered amounts to the polymer melt by the feeder for feeding the foaming agent. To this end the feeder comprises a feed conduit which extends through the extruder barrel and ends in the area of the mixing section of the extruder screw. When the foaming agent is fed in liquid form, e.g., by means of a diaphragm pump used as a metering pump, an exact dosage is possible. For liquefying the foaming agent the feeder may comprise a liquefier in addition to the metering pump.

After the foaming agent has been supplied, the mixture of polymer and foaming agent is mixed in the mixing section of the extruder screw, preferably by corresponding mixing elements, to obtain a single-phase solution. To improve homogeneity of the solution, a homogenizing and cooling section of the extruder screw may follow the mixing section.

Mixing section and homogenizing and cooling section of the extruder screw form a mixer of the extruder. During the mixing operation, viscosity is reduced, so that the single-phase solution must be cooled for maintaining an appropriate viscosity for the saturated polymer melt. The use of the mixing elements in the mixing section and the homogenizing and cooling section ensures that not only outer layers of the solution are cooled while an excessively high temperature and thus an insufficient viscosity are found inside the saturated polymer melt. This would, otherwise, lead to inhomogeneities in the final product. Due to the mixing elements and optionally further shear elements in the above-mentioned sections, cooling via convection takes place instead of cooling via heat conduction. This leads to a uniform cooling of the saturated polymer melt over its total cross-section, whereby the homogeneity of the final product is ensured.

In connection with the special extruder used in the invention, it should once again be noted that it is possible to feed an increased amount of foaming agent to the polymer melt due to the high maximum pressure which has already been built up in the feed section of the extruder screw, with the diffusion time or the time up to the saturation of the polymer melt being reduced. Furthermore, a smaller extruder can be used at the same flow or the same flow rate in comparison with an extruder without recesses or grooves in the feed section of the extruder screw.

It should once again be noted that instead of only one extruder it is, for instance, possible to use two sucessively arranged extruders, a first extruder comprising, for instance, an extruder screw with feed section, plasticating section and mixing section, and a second extruder an extruder screw with homogenizing and cooling section. Instead of only one extruder screw, it is also possible to use two parallel-arranged extruder screws in one or two extruders.

To form the final product the throttle is followed in the direction of transportation by a molding tool which is preferably bipartite and composed of a shaping die and a sizing die that are arranged one after the other in the direction of transportation.

It is here especially advantageous when the shaping die comprises a manifold having a cross-section larger than the cross-section of its discharge port. This ensures that following the pressure drop in the throttle the mixture of polymer and foaming agent passes through the shaping die substantially without any further pressure drop and it is only when the shaping die is left that foaming is resumed due to the pressure drop which takes place there. Attention should still be paid that the manifold of the shaping die has a relatively small length.

This special shaping die prevents any premature or excessively rapid cell growth upon nucleation. As a result of premature cell growth, large cells would be deformed in the further molding process. Instead of this, the degree of deformation of small cells is considerably smaller because of the considerably higher surface tension of such cells. Preferably, a further foaming of the polymer only occurs upon discharge through the shaping die.

In the succeeding sizing die, the polymer which has been subjected to further foaming is given its final shape, resulting in the production of a final product. To provide the final product with a good surface, the sizing die comprises a cooler. The cooler may use air or water as cooling medium. The surface of the foamed polymer is directly cooled in the sizing die by the cooler, so that cells near the surface can no longer grow and possibly explode after the completion of the final product.

Another cooler may follow the sizing die in the direction of transportation for further cooling of the final product.

According to the invention the standard materials used in extruders, for instance polyethylene, polypropylene and polystyrene, can be employed as polymer material.

An advantageous embodiment of the present invention will now be explained in more detail with reference to the figures attached to the drawing, of which:

Figure 1:
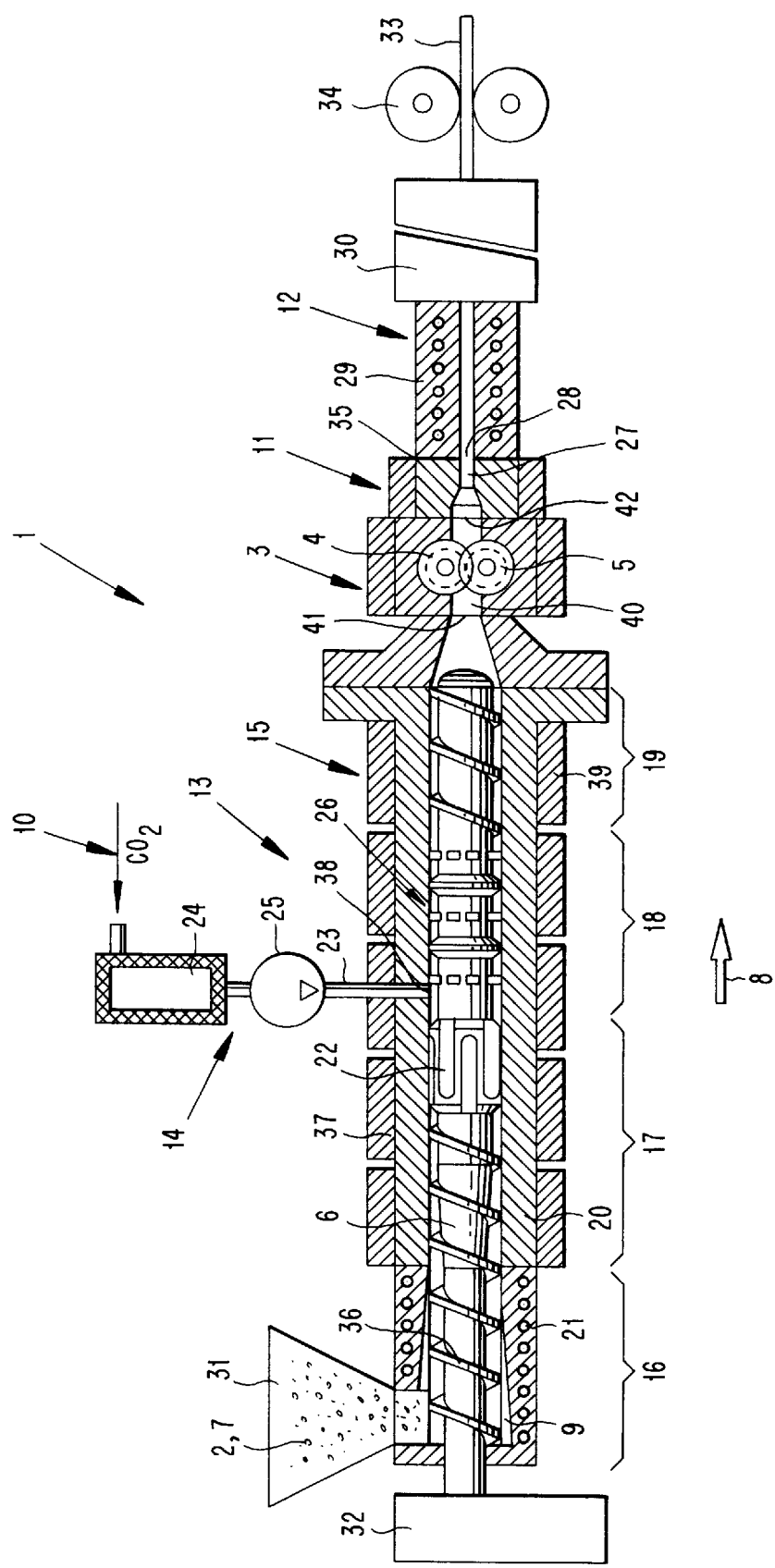
FIG. 1 is a longitudinal section through an extrusion apparatus of the invention.

FIG. 1 is a longitudinal section through an extrusion apparatus 1 of the invention. A motor/gear unit 32, an extruder 13, a gear pump 3 as a throttle, a molding tool composed of shaping die 11 and sizing die 12, a cooler 30 and transportation rollers 34 are shown one after the other in transportation direction 8.

The motor/gear unit 42 rotates an extruder screw 6 of extruder 13, the rotational axis of the screw being arranged in parallel with the transportation direction 8. Extruder screw 6 is rotatably supported in an extruder barrel 20 surrounding said screw. A hopper 31 is arranged at an end of extruder 13 which is adjacent to the motor/gear unit 32. A polymer 2 in the form of comminuted polymer particles 7, especially in the form of pellets, can be fed through said hopper to the extruder screw 6.

Extruder screw 6 comprises a plurality of functional sections arranged one after the other in axial direction or transportation direction 8. In the area of hopper 31, the extruder screw 6 comprises a feed section 16. This feed section is successively followed by a plasticating section 17, a mixing section 18, and a homogenizing and cooling section 19. In the area of feed section 16, groove-like recesses 9 are formed in extruder barrel 20. The recesses are made conical and extend with a decreasing depth towards the plasticating section 17, with the grooves terminating in feed section 16. A cooler 21 through which a cooling medium can e.g. be moved along a cooling coil is arranged in extruder barrel 20 in feed section 16 of extruder screw 6.

In extruder barrel 20, the groove-like recesses 9 are equidistantly arranged circumferentially around the extruder screw 6, a transportation helix 36 of the extruder screw 6 being arranged in the groove-free areas of the extruder barrel 20 in feed section 16, and also in the remaining sections 17, 18 and 19, namely at a small distance from an inner surface of extruder barrel 20.

In the plasticating section 17, the transportation helix 36 is interrupted by shear elements 22 arranged on the extruder screw 7. The elements extend to end next to an opening 38 of a feed conduit 23 which passes through the extruder barrel 20. A heater 37 is arranged around the extruder barrel 20 for heating the polymer particles 7 transported by the transportation helix 36 in the plasticating section 16.

A foaming agent 10 is fed via feed conduit 23 and via a diaphragm pump 25 as a metering pump to the polymer melt formed in the plasticating section 17 from the polymer particles 7. In the illustrated embodiment, the foaming agent 10 is carbon dioxide ($CO_2$). Carbon dioxide is fed from a source (not shown) to a liquefier 24 of the foaming agent feeder 14 and from said feeder to metering pump 25.

In the mixing section 18 of the extruder screw 6, in which the foaming agent 10 is fed via opening 38 to the polymer melt, the extruder screw 6 comprises a plurality of mixing elements 26 by which a single-phase solution of polymer melt and foaming agent can be produced. For further, intimate mixing, the mixing section 18 is followed by the homogenizing and cooling section 19 in which the transportation helix 36 of the extruder screw 6 is continued. Mixing section 18 and homogenizing and cooling section 19 form a mixer 15 of the extrusion apparatus 1 or extruder 13. A cooler 39 is arranged around the extruder barrel 20, at least in the homogenizing and cooling section 19, for cooling the mixture of polymer and foaming agent.

The homogenizing and cooling section 19 is followed by an end of the extruder 13 which tapers off to gear pump 3 in the form of a funnel. The end communicates with a channel 40 inside gear pump 3 via an inlet port 41 of the channel. The channel has a substantially constant cross-section along transportation direction 8 and ends with an outlet port 42. The gear pump 3 serves as a throttle, since an input pressure at input port 41 is greater than an output pressure at outlet port 42. A pressure drop takes place inside gear pump 3.

A first gear and a second gear 4, 5 are arranged inside gear pump 3 for conveying the mixture of polymer and foaming agent fed by extruder 13 to gear pump 3. The gears are in engagement with one another and rotatably supported around rotational axes extending in a direction perpendicular to the plane of the figures. A motor and a flow controller which control the speed or rpm of the gears are not shown in FIG. 1 for the sake of simplification. A flow rate for the mixture of polymer and foaming agent can be adjusted by the gear pump 3 on account of the flow controller. The flow controller may be formed separately or may be part of a control and evaluation unit (not shown). The unit can control both the speed of gears 4, 5 and the speed or rpm of the extruder screw 6 by means of the motor/gear unit 32. Furthermore, pressure sensors (not shown) for measuring the pressure at input port 41 and output port 42 can be connected to the control and evaluation unit. The pressure drop can be measured by means of the pressure sensors and the control and evaluation unit through the gear pump 3, which operates as a throttle, and can be maintained by varying the speed of the extruder screw 6 even in case of a change in the speed of gears 4, 5.

The gear pump 3 is followed by the shaping die 11 in transportation direction 8. In its interior, the shaping die comprises a manifold 27 which at its end next to the gear pump 3 has a cross-section corresponding to outlet port 42 and is provided at its opposite end with an outlet port 28 having a smaller cross-section. The shaping die 11 is followed by the sizing die 12, a thermal insulation 35 being arranged between the two dies. Inside the sizing die 12, the manifold 27 of the shaping die 11 is continued with a cross-section corresponding to the discharge port 28 of the die. To cool the mixture of polymer and foaming agent, which has been fed to the sizing die 12, the sizing die 12 includes a cooler 29, possibly in the form of a coil. Air or water can circulate as a cooling medium inside cooler 29.

For further cooling of the mixture of polymer and foaming agent, an additional cooler 30 is arranged in transportation direction 8 after the sizing die 12. A final product 33 of foamed polymer is formed by cooler 30 and discharged through shaping die 11 and sizing die 12 and transported off by transportation rollers 34 which are arranged at both sides of the final product 33.

Figure 2:
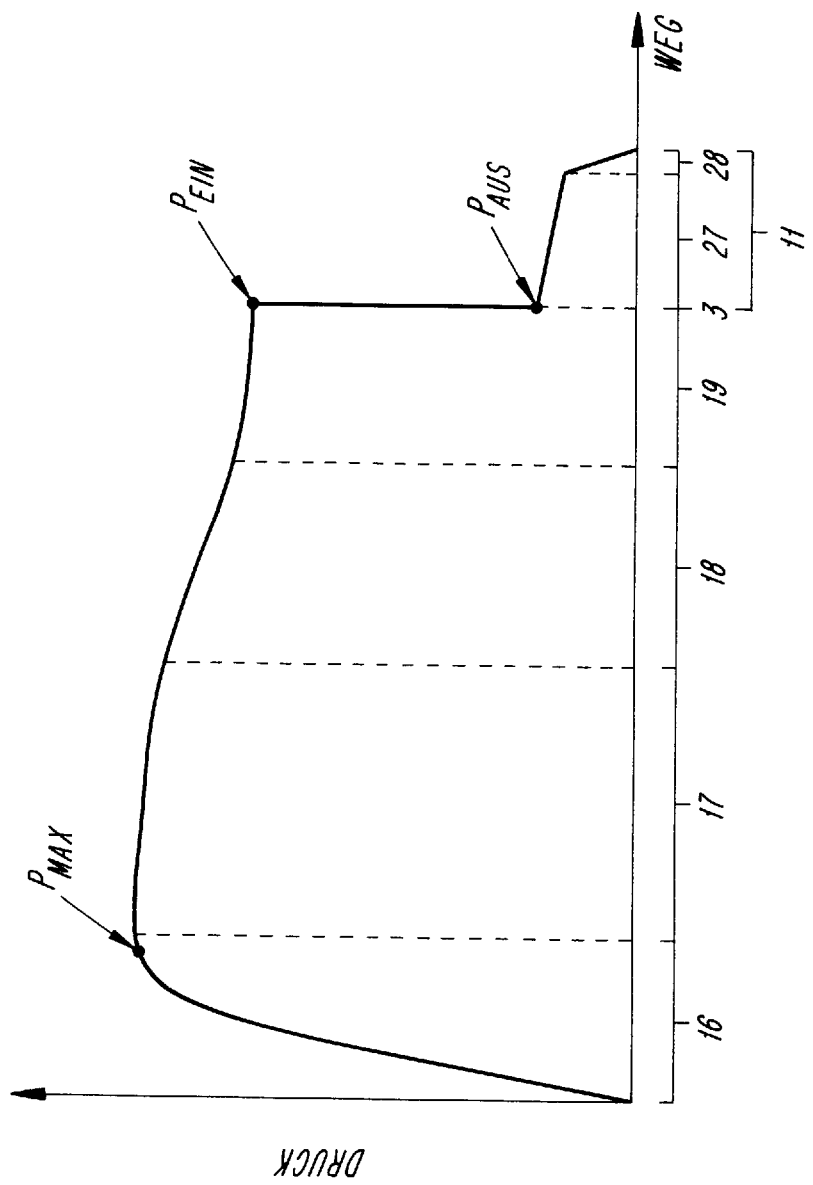
FIG. 2 shows a diagram for illustrating the pressure profile along the extrusion apparatus according to FIG. 1.

FIG. 2 shows a diagram for illustrating a pressure profile along the extrusion apparatus 1 of FIG. 1.

The travel of the mixture of polymer and foaming agent in transportation direction 8 through feed section 16, plasticating section 17, mixing section 18, homogenizing and cooling section 19, gear pump 3 and the shaping die 11, which is composed of manifold 27 and discharge port 28, is plotted on the horizontal axis. The pressure arising during said travel is plotted on the vertical axis.

In feed section 16, the pressure is rapidly raised to a maximum pressure $P_{MAX}$ because of the inner friction of the polymer particles which are transported through the transportation helix 36 and along the groove-shaped recesses 9. In the further sections 17, 18, 19, the pressure drops slightly to a value $P_{ein}$ at the inlet port 41 of gear pump 3; see FIG. 1. Inside gear pump 3, the pressure drops from $P_{ein}$ to $P_{aus}$ within a short period of time and over a short distance in transportation direction 8, with $P_{aus}$ being the pressure at the outlet port 42 of gear pump 3; see also FIG. 1.

This pressure drop effects nucleation within the mixture of polymer and foaming agent, with bubbles or cells that will become increasingly larger in the further course being formed from the nuclei, resulting in a foaming of the polymer.

Inside shaping die 11, the pressure drops slightly along manifold 27 of the die, and a further greater pressure drop to ambient pressure is substantially observed at the discharge port 28 of the shaping die 11.

Especially the last-mentioned pressure drop will have the effect that the nuclei become larger, resulting in larger gas bubbles or cells, so that the polymer is further foamed and then cooled on the surface to stabilize the surface in the sizing die 12; see FIG. 1.

On account of the special pressure profile according to FIG. 2, there is a high melting pressure within plasticating section 17, whereby the shear elements and optionally mixing elements can be employed in an improved manner in this section. Furthermore, there will be a high saturation pressure inside mixing section 18, whereby greater amounts of foaming agent can diffuse into the polymer melt more rapidly. Moreover, the high input pressure of the gear pump and the-high pressure drop rate lead to a high nucleation rate. The maximum pressure is already observed at the end of the feed section 16 of the high pressure drop rate inside the gear pump that the nucleation process is homogeneous over the cross-section of the discharged material and in the transportation direction, resulting in a foamed polymer as an end product having a microcellular or submicrocellular structure and isotropic properties.

I claim:

1. A process for producing a foamed polymer by means of an extrusion apparatus (1), the process comprising the steps of:

i) supplying said polymer (2) to said extrusion apparatus (1);

ii) melting said polymer;

iii) supplying a foaming agent to said polymer melt in said extrusion apparatus at a specific pressure and a specific temperature;

iv) mixing said foaming agent and polymer melt;

v) cooling said mixture of polymer and foaming agent;

vi) producing a pressure drop as a pressure difference between input pressure and output pressure of a throttle (3) for cell nucleation within said mixture; and vii) shaping and foaming said polymer by making the nuclei grow and by demixing foaming agent and polymer at least in part, and stabilizing the foamed polymer by cooling, characterized in that a flow rate of said throttle is adjusted in step vi) for controlling the mixing amount of polymer and foaming agent supplied by said throttle, and the input pressure of said throttle (3) is varied in response to the output pressure to maintain the pressure drop independently of the set flow rate.

2. A process according to claim 1, characterized in that the flow rate is adjusted by varying the rotational speed of a gear pump operating as said throttle (3).

3. A process according to claim 1 or 2, characterized in that input pressure and output pressure of said throttle (3) are determined by a control and evaluation device.

4. A process according to claim 1, characterized in that the input pressure of said throttle (3) is varied by varying a rotational speed of an extruder screw (6) of said extrusion apparatus (1).

5. A process according to claim 1, characterized in that said control and evaluation device controls the rotational speed of a first gear (4) and/or said extruder screw (6).

6. A process according to claim 1, with said polymer (2) being fed in the form of comminuted polymer particles, especially as pellets, characterized in that prior to step ii) the pressure inside said extrusion apparatus (1) is raised to a maximum pressure by internal friction.

7. A process according to claim 1, characterized in that a first part of the transported polymer particles is moved along recesses extending essentially in the direction of transportation, and a second part is directly moved through said extruder screw (6).

8. A process according to claim 1, characterized in that said polymer particles are tempered in the area where the pressure is raised to its maximum level inside said extrusion apparatus (1).

9. A process according to claim 1, characterized in that in step iii) said foaming agent is fed to said polymer melt in metered amounts and in liquid form.

10. A process according to claim 1, characterized in that in step vii) said mixture of polymer and foaming agent passes through a first shaping die essentially without any pressure drop and is foamed when leaving said shaping die.

11. A process according to claim 10, characterized in that said foamed polymer is directly fed to a sizing die (12) for producing a final product.

12. A process according to claim 1, characterized in that said foamed polymer is cooled in and/or after said sizing die (12).

* * * * *

UNITED STATES PATENT AND TRADEMARK OFFICE
CERTIFICATE OF CORRECTION

PATENT NO. : 5,889,064　　　　　　　　　　　　　　　　　Page 1 of 2
DATED　　　 : March 30, 1999
INVENTOR(S) : Torsten Hermann It is certified that error appears in the above-indentified patent and that said Letters Patent is hereby corrected as shown below:

On the title page, item [56], insert the following references:

U.S. PATENT DOCUMENTS

| PATENT NO. | DATE | NAME | CLASS | SUBCLASS | FILING DATE |
|---|---|---|---|---|---|
| 4,473,665 | 09-25-84 | Martini-Vvedensky et al. | | | |
| | | | | | |

OTHER DOCUMENTS (Including Author, Title, Date, Pertinent Pages, Etc.)

| |
|---|
| Baldwin, D.F., "Microcellular Polymer Processing and the Design of a Continuous Sheet Processing System," Ph.D. Thesis, Massachusetts Institute of Technology, Cambridge, MA 1994 |
| Collias, D.J. and Baird, D.G., "Does a Microcellular Structure Improve the Modulus of Toughness of a Polymer Matrix," *Society of Plastics Engineers Technical Papers*, Vol. 38, pp. 1532-1535, 1992 |
| Crank, J., *The Mathemetics of Diffusion*, Clarendon Press, Oxford, pp. 203-253, 1975 |
| Durril, P.L. and Griskey, R.G., "Diffusion and Solution of Gases in Thermally Softened or Molten Polymers: Part I," *A.I.Ch.E. Journal*, Vol. 12, pp. 1147-1151, 1966 |
| Durril, P.L. and Griskey, R.G., "Diffusion and Solution of Gases in Thermally Softened or Molten Polymers: Part II," *A.I.Ch.E. Journal*, Vol. 15, pp. 106-110, 1969 |
| Fritz, H.G., "Kunststofftechnologie - Einführung und Grundlagen," Institut für Kunststofftechnologie der Universität Stuttgart (IKT), Stuttgart (in German) - TABLE OF CONTENTS ONLY |
| Hermann, T., "Extrusion of Microcellular Plastics: Design Issues for Implementation and Scale-up," Thesis/Studienarbeit, University of Stuttgart, Stuttgart, 1994 |
| Krevelen, D.W., Van, *Properties of Polymers*, Elsevier, New York, pp. 404-425, 1976 |
| Koros, W.J. and Paul, D.R., "Sorption and Transport of $CO_2$ Above and Below the Glass Transition of Poly(ethylene terephthalete)," *Polymer Engineering and Science*, Vol. 20, pp. 14-19, 1980 |

UNITED STATES PATENT AND TRADEMARK OFFICE
CERTIFICATE OF CORRECTION

PATENT NO. : 5,889,064
DATED : March 30, 1999
INVENTOR(S) : Torsten Hermann

It is certified that error appears in the above-identified patent and that said Letters Patent is hereby corrected as shown below:

Park, C.B., "The Role of Polymer/Gas Solutions in Continuous Processing of Microcellular Polymers," Ph.D. Thesis, Massachusetts Institute of Technology, Cambridge, MA, 1993

Seeler, K.A. and Kumar, V., "Fatique of Notched Microcellular Polycarbonate," *Cellular Polymers*, MD-Vol. 38, ASME, pp. 93-108, 1992

Seeler, K.A. and Kumar, V., "Tension-Tension Fatique of Microcellular Polycarbonate: Initial Results," *Journal of Reinforced Plastics and Composites, Vol. 12, pp. 359-376, 1993*

Suh, N.P., "Microcellular Plastics," *Innovations in Polymer Processing* (Ed. by J. Stevensen), 1995

Signed and Sealed this

Twenty-first Day of December, 1999

Attest:

Q. TODD DICKINSON

Attesting Officer

Acting Commissioner of Patents and Trademarks